US010989364B2

(12) United States Patent
Zantop

(10) Patent No.: US 10,989,364 B2
(45) Date of Patent: Apr. 27, 2021

(54) RUGGEDIZED, HIGH EFFICIENCY, DIFFUSE LUMINAIRE

(71) Applicant: Ace Aircraft Inc., Belleville, MI (US)

(72) Inventor: David V. Zantop, Belleville, MI (US)

(73) Assignee: ACE AIRCRAFT INC., Belleville, MI (US)

( * ) Notice: Subject to any disclaimer, the term of this patent is extended or adjusted under 35 U.S.C. 154(b) by 0 days.

(21) Appl. No.: 16/559,290

(22) Filed: Sep. 3, 2019

(65) Prior Publication Data

US 2020/0063921 A1 Feb. 27, 2020

Related U.S. Application Data

(63) Continuation of application No. 15/630,639, filed on Jun. 22, 2017, now abandoned.

(Continued)

(51) Int. Cl.
*F21K 9/232* (2016.01)
*F21V 15/01* (2006.01)

(Continued)

(52) U.S. Cl.
CPC .............. *F21K 9/232* (2016.08); *F21S 8/085* (2013.01); *F21V 5/008* (2013.01); *F21V 5/043* (2013.01);

(Continued)

(58) Field of Classification Search
CPC .. F21K 9/232; G02B 1/14; G02B 1/11; G02B 3/08; F21S 8/085; F21V 5/008;

(Continued)

(56) References Cited

U.S. PATENT DOCUMENTS

2006/0239000 A1* 10/2006 McDermott, Sr. ...... F21V 5/045 362/244
2011/0090677 A1* 4/2011 Fett ......................... F21V 3/026 362/154

(Continued)

OTHER PUBLICATIONS

"U.S. Appl. No. 15/630,639, Advisory Action dated Sep. 13, 2019", 3 pgs.

(Continued)

*Primary Examiner* — Andrew J Coughlin
*Assistant Examiner* — Jessica M Apenteng
(74) *Attorney, Agent, or Firm* — Schwegman Lundberg & Woessner, P.A.

(57) ABSTRACT

A ruggedized, high efficiency, diffuse luminaire with a shaped lens diffuser that is composed of a semi-soft, flexible material that helps withstand damaging impacts and protects the internal electrical components. The lens diffuser may enclose one or more internal mirrors or employ an innovative Fresnel-like lens that projects light omni-directionally and that wraps around the inside of the lens for more efficient distribution of illumination and the elimination of up and down loss through re-projecting vertical losses onto the horizontal plane. The lens diffuser may incorporate a UV filtration compound molded directly into the materials composing the lens rather than applied or painted onto the surface or surfaces of the lens. The lens diffuser may incorporate two additional innovations that better enable the reduction of glare through varying the thickness of the lens diffuser, based on its relative proximity to the bulb(s) or lamp(s), and/or applying a patterning of reflective, semi-reflective or non-reflective material to the inside of the lens diffuser relative to the proximity to the illumination source to reflect away a portion of the light and thereby attain an even distribution of light across the surface of the lens (Continued)

without having to ensure that the lens surface is located equidistant or nearly equidistant from the lamp or lamps within the lens.

20 Claims, 4 Drawing Sheets

Related U.S. Application Data

(60) Provisional application No. 62/354,486, filed on Jun. 24, 2016.

(51) Int. Cl.

| | |
|---|---|
| ***G02B 3/08*** | (2006.01) |
| ***G02F 1/01*** | (2006.01) |
| ***G02B 1/14*** | (2015.01) |
| ***G02B 1/11*** | (2015.01) |
| ***F21V 5/04*** | (2006.01) |
| ***F21S 8/08*** | (2006.01) |
| ***F21V 7/00*** | (2006.01) |
| ***F21V 5/00*** | (2018.01) |
| ***G02B 19/00*** | (2006.01) |

(52) U.S. Cl.
CPC .............. *F21V 5/045* (2013.01); *F21V 5/046* (2013.01); *F21V 7/0016* (2013.01); *F21V 15/01* (2013.01); *G02B 1/11* (2013.01); *G02B 1/14* (2015.01); *G02B 3/08* (2013.01); *G02B 19/0028* (2013.01); *G02F 1/0105* (2013.01)

(58) Field of Classification Search
CPC .......... F21V 5/043; F21V 5/045; F21V 5/046; F21V 7/0016; F21V 15/01; G02F 1/0105
USPC ....................................................... 362/217.1
See application file for complete search history.

(56) References Cited

U.S. PATENT DOCUMENTS

2013/0094198 A1* 4/2013 Lee ....................... F21V 3/0625 362/217.05
2013/0188347 A1* 7/2013 Bryan ....................... F21S 8/03 362/235
2013/0208469 A1* 8/2013 Progl .................... F21V 29/506 362/235
2014/0211467 A1* 7/2014 Yang ......................... F21V 3/10 362/235
2016/0018072 A1* 1/2016 Osburn ................... F21L 14/02 362/646
2017/0370529 A1 12/2017 Zantop

OTHER PUBLICATIONS

"U.S. Appl. No. 15/630,639, Final Office Action dated Apr. 2, 2019", 13 pgs.
"U.S. Appl. No. 15/630,639, Non Final Office Action dated Jul. 9, 2018", 11 pgs.
"U.S. Appl. No. 15/630,639, Response Filed Sep. 3, 2019 to Final Office Action dated Apr. 2, 2019", 7 pgs.
"U.S. Appl. No. 15/630,639, Response filed Dec. 3, 2018 to Non Final Office Action dated Jul. 9, 2018", 8 pgs.

* cited by examiner 301
302
303
304
305
306
307
308

RUGGEDIZED, HIGH EFFICIENCY, DIFFUSE LUMINAIRE

CLAIM OF PRIORITY

This application is a Continuation of U.S. patent application Ser. No. 15/630,639, filed Jun. 22, 2017, which claims the benefit of U.S. Provisional Patent Application Ser. No. 62/354,486, filed Jun. 24, 2016, both of which are hereby incorporated by reference in their entirety.

FIELD OF THE DISCLOSURE

The present disclosure relates to a reflecting luminaire and system of luminaires working in conjunction for fixed and transportable uses.

BACKGROUND

Lighting systems (hereinafter "luminaires") are in common use in a wide variety of private, commercial, industrial and government applications. A variety of glare reducing approaches have been attempted in various designs, however glare reducing lens diffusers are typically large in size and therefore bulky, difficult to transport, and potentially heavy or, if made lightweight, then fragile.

There are many drawbacks of large lens diffusers which appear unavoidable given the method of glare reduction used in conventional systems. Most low glare luminaires use a lamp or lamps with an arc type lighting source that typically produces a small, high intensity light emission from a single point. First, the desired reduction of glare is achieved by using a diffusing lens that is relatively large. This large surface area allows the surface luminance (luminance per square unit of area) to be relatively low, and thus glare reducing, while keeping the total luminance relatively high. Second, the glare is reduced by ensuring that no part of the lens suffers from significantly higher illumination than the other parts of the lens, i.e., it is desirable to have even light distribution over the entire surface of the lens diffuser. Many glare-reducing luminaires that use lens diffusers, including so-called "balloon lighting", solve this problem by utilizing a spheroid or ellipsoidal shape to maximize surface area per unit of volume to ensure even light distribution over the surface area because the distance from the arc emission point to the diffusing surface of the lens or balloon is approximately equidistant. Glare problems can be further exacerbated when extremely powerful and bright lighting is needed, which means an even larger lens diffuser is required for such applications. Third, the large-size diffusers that result are difficult to transport around, unless they are dismantled. Even when erected, larger lenses present a significant visual impact, blocking sight lines when mounted, such as on a pole or mast, and likewise suffer instability and may be knocked over in high winds.

There continues to be a need in the art for a low glare luminaire that is less prone to breakage, provides enhanced lighting efficiency, effectively filters or eliminates ultraviolet light, reduces energy costs (and carbon footprint) and reduces harmful glare without being overly large in size.

BRIEF DESCRIPTION OF THE DRAWINGS

The following drawing and descriptions provide information and reference data regarding embodiments of the luminaire of the present disclosure. Reference numerals highlight features of the lighting system, as follows.

DETAILED DESCRIPTION

Figure 1:
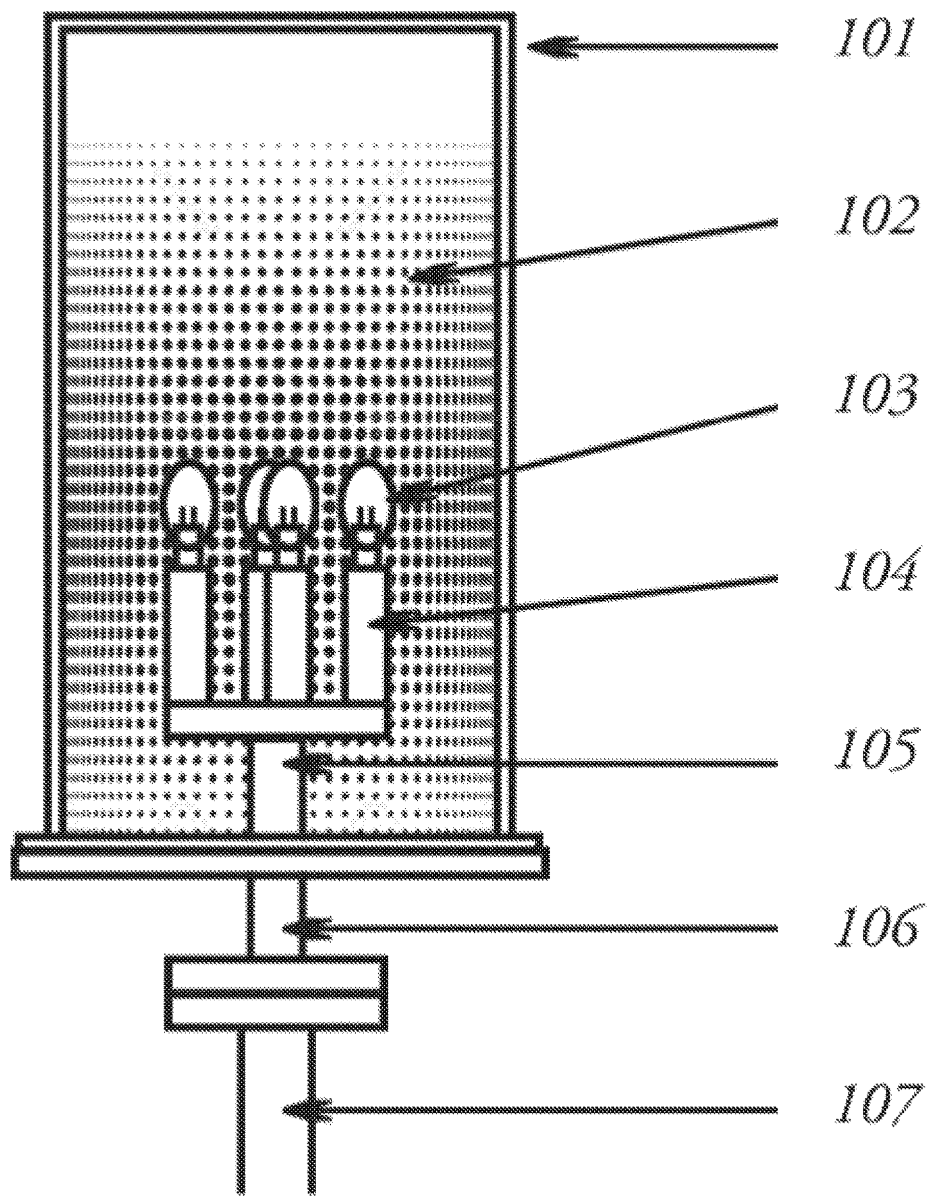
FIG. 1 illustrates an embodiment of the diffuse luminaire, showing a cross section of a four bulb lamp arrangement internal to the semi-soft, flexible lens, with a combination of the cylindrical lens shape and patterned mirrors with higher reflective density at points closer to the light emission point around the interior of the cylindrical lens.

The present disclosure relates to a lensed, highly efficient, ruggedized, shock absorbing, diffuse, reflecting luminaire or series of luminaires working in conjunction for both fixed (permanent, pole-mounted or wall/ceiling mounted) and transportable uses (i.e., light towers) for use in private, commercial, industrial and government illumination (lighting) applications FIG. 1 illustrates an embodiment of the diffuse luminaire. The lens diffuser 101 [in this example cylindrical] may be translucent or semi-transparent so as to best diffuse the illumination and thereby achieve a reduction in harmful glare from the internally mounted lamp or lamps 103. The lens diffuser 101 may be manufactured of a semi-soft and flexible material such as polyethylene and may be white, translucent, transparent, or colored. The lens diffuser 101 may be water resistant and weather proof. The lens diffuser 101 as shown here is cylindrical in shape, however, the present disclosure is not so limited and diffuser 101 may be any other shape such as cubical, rectangular box, spherical, pentagonal cylinder, hexagonal cylinder, octagonal cylinder, rectangular with a airfoil-cross section, conical, hemi-spherical, spheroid, oblate spheroid, prolate spheroid, faceted polyhedroid or any other shape. The lens diffuser 101 is supported by a rigid base plate and mast apparatus 106 to which, in turn, an internal mast 105 is mounted. The internal mast 105 is typically covered with a chrome or mirror compound for maximum internal reflectivity. The base plate 106 is mounted on a pole or mast 107, including a telescoping type as is well-known in the art, and/or may be mounted on the wall or ceiling, either as depicted or inverted, and may be designed to be adjustable in angle, or easily and quickly removable for transport and/or maintenance. Lamp posts 104 [in this case four are depicted] are mounted on the internal mast 105 to which are affixed the individual lamp or lamps 103 [in this example a four bulb High Intensity Discharge (HID) lamp arrangement is depicted]. A partly reflective and small micro-mirror patterning or other reflective patterning 102 is applied so that it wraps around the inside of the cylindrical lens diffuser 101 such that the illumination produced by the lamp or lamps 103 is partially reflected back into the interior of the cylindrical lens diffuser 101, thereby reducing the amount of light shining through the lens diffuser 101 at points closer to the lamp or lamps 103, thereby achieving relatively more even light distribution across the surface of the lens diffuser 101, and reducing harmful glare from the luminaire. The lens diffuser 101 may include a UV filtration compound that is molded directly into the material composing the lens diffuser itself, i.e., rather than a UV filtration paint or coating that is applied to the lamp or lamps 103 or to the lens diffuser 101. Alternatively, the lamp or lamps 103 may be tuned to emit light only in the human range of the light spectrum [the visible spectrum] as is common in embodiments that use an Magnetic Induction Lighting (MIL) lamp or lamps, thereby eliminating the need to include and mold a UV filtration compound into the lens diffuser 101. The base plate 106 may be manufactured of a semi-soft, flexible or rigid polymer material such as polyethylene, polycarbonate, acrylic or other material as is known in the art. Base plate 106 may be opaque, translucent or semi-transparent and may be white, transparent, or colored. Base plate 106 may be an inherently a UV resistant material or be manufactured with a filler or coating that provides UV resistance, including with a UV filtering compounded mixed evenly into the molded material rather than applied as a coating. Base plate 106 may be water resistant or weather proof. In further embodiments, base plate 106 may be metal such as aluminum or steel, or other non-transparent or mirrored material. The lens diffuser 101 may have ventilation holes of any cross section or may achieve ventilation through louvers, slots, or holes. The lamp assembly 103 may use any lamp technology selected from but not restricted to HID, incandescent, LED, plasma, OLED, MIL, HMI, MSR or other lighting or lamp technologies.

Figure 2:
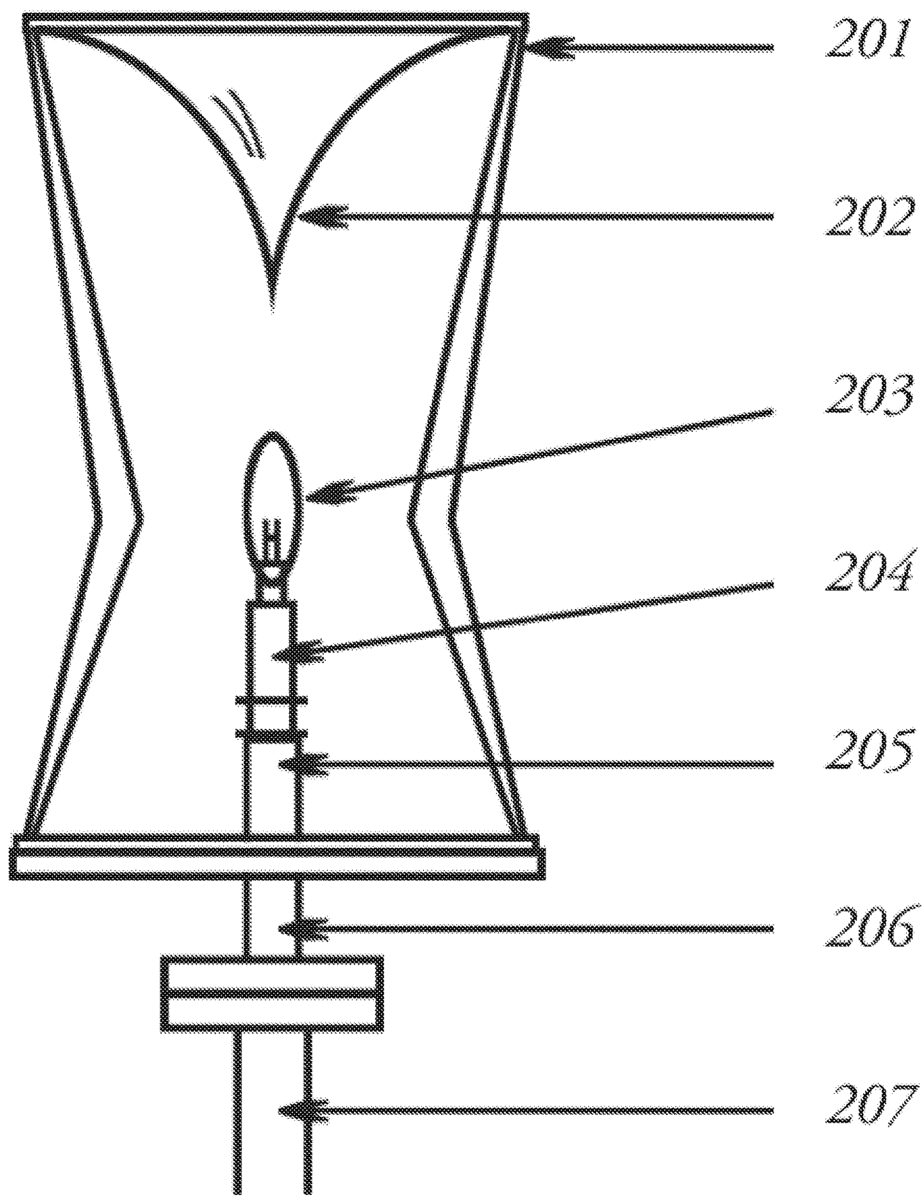
FIG. 2 illustrates an embodiment of the diffuse luminaire, showing a cross section of the combination of a tapered, semi-cylindrical lens shape, varying lens thickness, placement of internal mirrors, and the use of patterned mirrors with higher reflective density at points closer to the light emission point.

FIG. 2 illustrates a second embodiment of the diffuse luminaire of the present subject matter. The lens diffuser 201 [in this example a tapered cylindrical lens] may be translucent or semi-transparent so as to best diffuse the illumination and thereby achieve a reduction in harmful glare from the internally mounted lamp or lamps 203. As is depicted in FIG. 1, the lens diffuser 201 may be manufactured of a semi-soft and flexible material such as polyethylene and may be white, translucent, transparent, or colored. The lens diffuser 201 may be water resistant and weather proof. The lens diffuser 201 as shown here is a tapered cylindrical shape, however, the present disclosure is not so limited and diffuser 201 may be any other shape such as cubical, rectangular box, spherical, pentagonal cylinder, hexagonal cylinder, octagonal cylinder, rectangular with a airfoil-cross section, conical, hemi-spherical, spheroid, oblate spheroid, prolate spheroid, faceted polyhedroid and all of the above in tapered or semi-tapered shapes, or any other shape. The lens diffuser 201 is supported by a rigid base plate and mast apparatus 206 to which, in turn, an internal mast 205 is mounted. The base plate 206 is mounted on a pole or mast 207, including a telescoping type as is well-known in the art, and/or may be mounted on the wall or ceiling, either as depicted or inverted, and may be designed to be adjustable in angle, or easily and quickly removable for transport and/or maintenance. The lamp posts 204 [in this case a single post is depicted] is mounted on the internal mast 205 to which are affixed the individual lamp or lamps 203 [in this example a single Medium Source Rare Earth (MSR) lamp is depicted]. The lens diffuser 201 has a varying thickness such that the illumination produced by the lamp or lamps 203 is increasingly blocked or reflected back within the cylindrical lens diffuser 201, thereby reducing the amount of light shining through the lens diffuser 201 at points closer to the lamp or lamps 203, thereby achieving relatively more even light distribution across the surface of the lens diffuser 201, and reducing harmful glare from the luminaire. As depicted in FIG. 1, the lens diffuser 201 may include a UV filtration compound that is molded directly into the material composing the lens diffuser itself, i.e., rather than a UV filtration paint or coating that is applied to the lamp or lamps 203 or to the lens diffuser 201. Alternatively, as depicted in FIG. 1, the lamp or lamps 203 may be tuned to emit light only in the human range of the light spectrum [the visible spectrum] as is common in embodiments that use an Magnetic induction Lighting (MIL) lamp or lamps, thereby eliminating the need to include and mold a LV filtration compound into the lens diffuser 201. The base plate 206 may be manufactured of a semi-soft, flexible or rigid polymer material such as polyethylene, polycarbonate, acrylic or other material as is known in the art. Base plate 206 may be opaque, translucent or semi-transparent and may be white, transparent, or colored. Base plate 206 may be an inherently a UV resistant material or be manufactured with a filler or coating that provides UV resistance, including with a UV filtering compounded mixed evenly into the molded material rather than applied as a coating. Base plate 206 may be water resistant or weather proof. In further embodiments, base plate 206 may be metal such as aluminum or steel, or other non-transparent or mirrored material. The lens diffuser 201 may have ventilation holes of any cross section or may achieve ventilation through louvers, slots, or holes. The lamp assembly 203 may use any lamp technology selected from but not restricted to HID, incandescent, LED, plasma, OLED, MIL, HMI, MSR or other lamp or lighting technologies.

Figure 3:
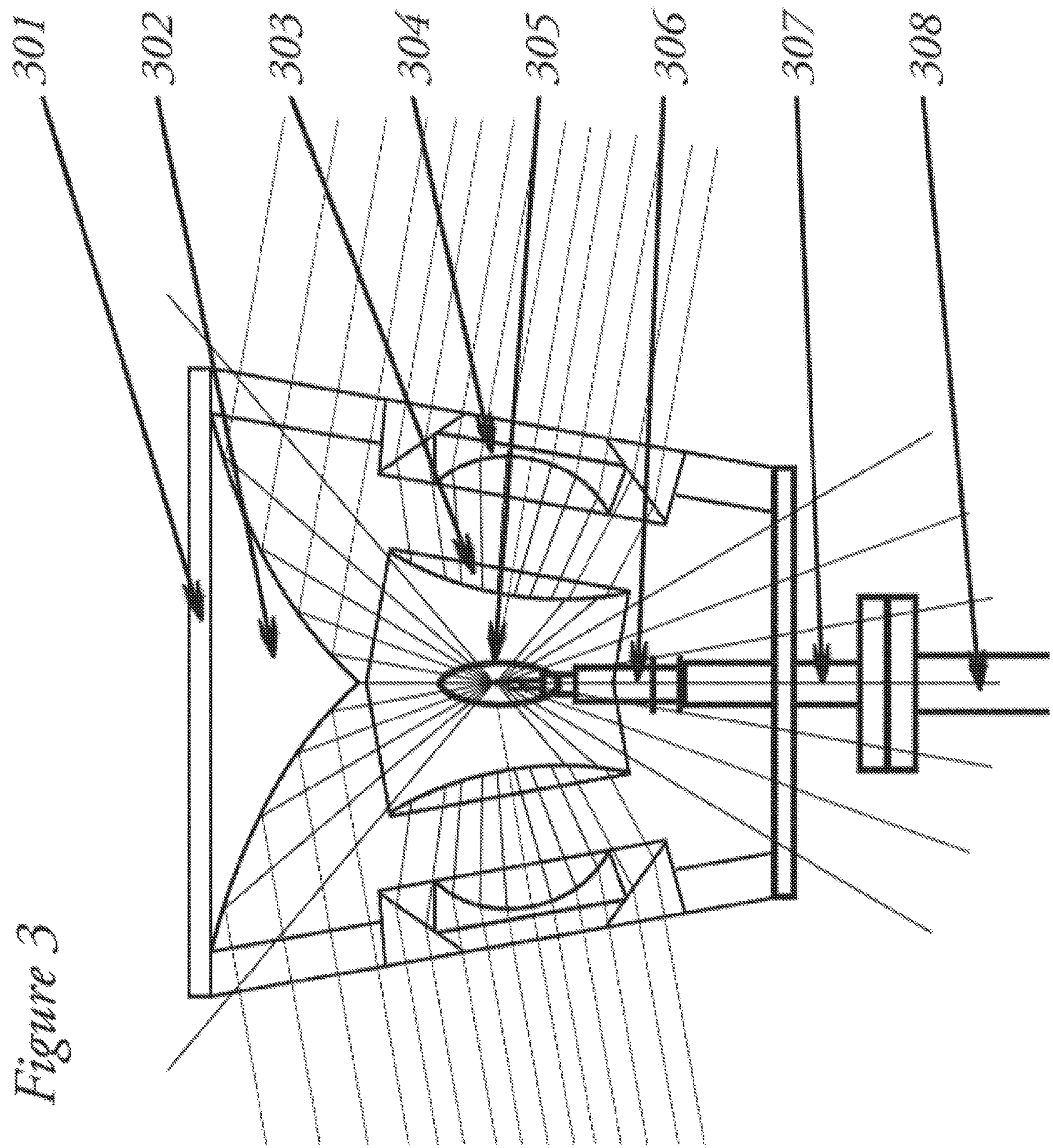
FIG. 3 illustrates an embodiment of the diffuse luminaire, showing a cross section of the combination of a double Fresnel-type lens with internal mirrors housed within an outer lens diffuser for down-canted horizontal projection of reduced glare or low glare illumination.
Figure 4:
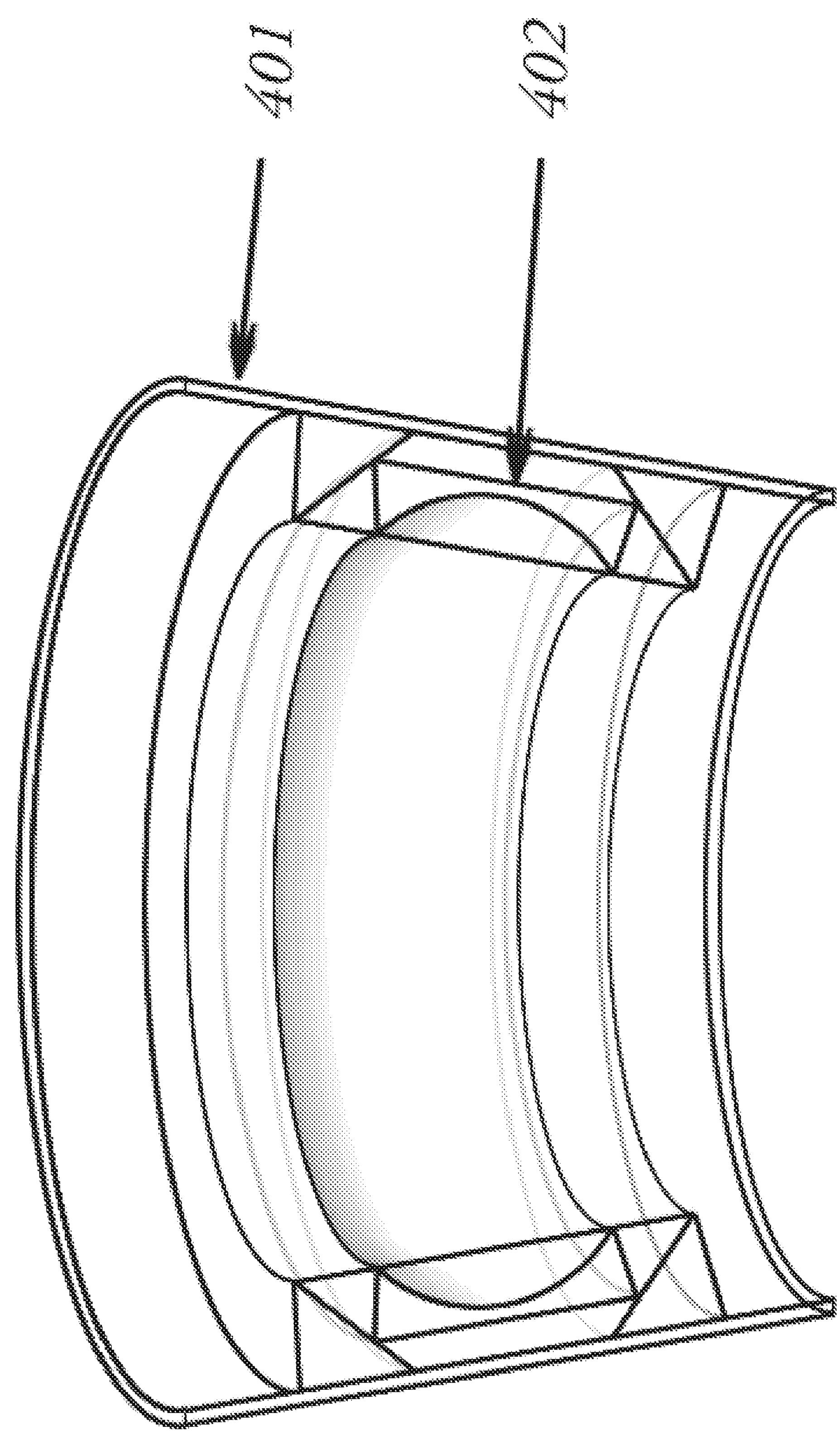
FIG. 4 illustrates an omni-directional Fresnel-like tens shape.

FIG. 3 illustrates a third embodiment of the diffuse luminaire. The top cap of lens diffuser 301 is typically opaque and waterproof, though it may be translucent or semi-transparent. An internal, conical top mirror 302 is attached to the top cap. The inner Fresnel-type lens 303 is transparent and surrounds the bulb with air holes at the top for cooling and, typically being composed of glass or optical polymer, refracts the light partly. The outer Fresnel-type lens 304, is designed to refract the light to the horizontal or a down-canted angle from horizontal, such that nearly all light emitted from the lamp 305 projects horizontally or on a down-canted angle from horizontal. The internally mounted lamp 305 is mounted in the center. The outside of the second Fresnel-type lens diffuser 304 may be white, translucent, transparent, or colored and may be water resistant and weather proof. The Fresnel-type lens diffuser 304 as shown here is a tapered cylindrical shape, however, the present disclosure is not so limited and diffuser 304 may be any other shape such as cubical, rectangular box, spherical, pentagonal cylinder, hexagonal cylinder, octagonal cylinder, rectangular with a airfoil-cross section, conical, hemi-spherical, spheroid, oblate spheroid, prolate spheroid, faceted polyhedroid and all of the above in tapered or semi-tapered shapes, or any other shape. The Fresnel-type lens diffuser 304 is supported by a rigid base plate and mast apparatus 307 to which, in turn, an internal mast 306 is mounted. The base plate 307 is mounted on a pole or mast 308, including a telescoping type as is well-known in the art, and/or may be mounted on the wall or ceiling, either as depicted or inverted, and may be designed to be adjustable in angle, or easily and quickly removable for transport and/or maintenance. The lamp 305, in this example, is a single 4,000 W Medium Source Rare Earth (MSR) lamp. The Fresnel-type lens diffuser 304 may include a UV filtration compound that is molded directly into the material composing the lens diffuser itself, i.e., rather than a UV filtration paint or coating that is applied to the lamp or lamps 305 or to the lens diffuser 304. Alternatively, the lamp or lamps 305 may be tuned to emit light only in the human range of the light spectrum [the visible spectrum] as is common in embodiments that use an Magnetic Induction Lighting (MIL) lamp or lamps, thereby eliminating the need to include and mold a UV filtration compound into the Fresnel-type lens diffuser 304. The base plate 307 may be manufactured of a semi-soft, flexible or rigid polymer material such as polyethylene, polycarbonate, acrylic or other material. Base plate 307 may be opaque, translucent or semi-transparent and may be white, transparent, or colored. Base plate 307 may be an inherently a UV resistant material or be manufactured with a filler or coating that provides UV resistance, including with a UV filtering compounded mixed evenly into the molded material rather than applied as a coating. Base plate 307 may be water resistant or weather proof and may mount cooling fans or have air holes for cooling of the internal lamp or lamps. In further embodiments, base plate 307 may be metal such as aluminum or steel, or other non-transparent or mirrored material. The Fresnel-type lens diffuser 304 may have ventilation holes of any cross section or may achieve ventilation through louvers, slots, or holes. The lamp assembly 305 may use any lamp technology selected from but not restricted to HID, incandescent, LED, plasma, OLED, HMI, MSR or other lamp or lighting technologies, FIG. 4 illustrates half of the omni-directional variation to the Fresnel-like lens 402, showing how the Fresnel-like lens 402 wraps around the interior of the outer lens shell 401, which serves either as a light diffuser or simply as a protective cover over the omni-directional Fresnel-like lens. The outer lens shell 401 may be manufactured of a semi-soft and flexible material such as polyethylene and may be white, translucent, transparent, or colored. The outer lens shell 401 may be water resistant and weather proof. The omni-directional Fresnel-like lens 402 provides lensed light omni-directionally and completely around the inside of the outer lens shell 401.

In various of the foregoing embodiments, UV filtration is employed. In certain embodiments, other apparatus may optionally be employed, such as one or more fans for cooling. In various embodiments the base plate includes one or more fans to cool it. In various embodiments, the fans can be located in other portions of the device than the base plate. In various embodiments one or more fans may be directed to drawing in cooler air into the device. In various embodiments one or more fans may be directed to drawing heat out of the device. In various embodiments, combinations of one or more fans drawing in cooler air and one or more fans blowing hotter air out of the device may be employed.

Some of the various embodiments described herein may include one or more of the following aspects:

FIRST ASPECT: A first aspect of various embodiments of the present subject matter is that it achieves reduced glare despite the small size of the diffusing lens through varying the thickness of the diffusing lens depending on the distance of the lens surface from the bulb or bulbs. This allows a lower power bulb or bulbs within the shaped lens to improve efficiency and create even light distribution over the surface of the lens, with corresponding reduction in glare.

SECOND ASPECT: A second aspect of various embodiments of the present subject matter involves using internally mounted mirrors (or any similar wholly or partially reflecting surface) within the luminaire's lens both to redirect and focus the light toward where it is most needed and to reduce glare by evening out the illumination across the inner surface of a shaped lens. This is markedly different from the practice common in the art of projecting light in all directions in three dimensions, as with a "balloon light" or other spherical lighting apparatus. Rather than the focusing of light as seen with mirrored headlamps, searchlights, etc., this luminaire instead is designed to achieve area lighting by using mirrors to spread light out more evenly over the inside of the lens and also to project the light directionally in a horizontal arc to more efficiently spread the available illumination over a wider area rather than focusing it narrowly onto specific areas only. Additionally, through certain embodiments of this innovative projection system, the diffusing lens with its internal mirrors in combination reduces so-called "hot spots" where too much light is cast relatively close to the luminaire itself or at areas where the lights are "aimed". Internal mirrors may be mounted, separately or in combination, on top and on bottom of the lens. Additionally, external mirrors may be mounted to better focus the directionality of the projected illuminance.

THIRD ASPECT: A third aspect of various embodiments of the present subject matter involves using a cylindrical or tapered, semi-cylindrical, shaped lens, and specifically, these types of lens shapes project illumination where it is most needed, reducing up-loss and down-loss, and minimizing over-lighting in proximity to the luminaire by projecting the available light outward horizontally. This can be summed up as resulting in the more efficient area utilization of the lumen output. This results in less deviation in lux measurements from the mean achieved across a wide area that is illuminated. A cylindrical and tapered semi-cylindrical lens shape allows the lower power lighting source (bulb or bulbs) to efficiently illuminate areas to lux levels that are otherwise typically achievable only with high wattage bulbs mounted within larger spherical lenses. In combination with the first and aspects, above, this achieves the desired reduction in glare without the need for the diffusing surface to be equidistant from the arc emission point, as is often cited in the art, thereby allowing a much more energy efficient luminaire.

Some advantages of the shaped cylindrical or semi-cylindrical lens diffuser include one or more of: a) the narrow design of the lens allows the luminaire to be easily transported (such as on a mobile light tower), without having to disassemble or collapse the lens; b) the narrow design of the lens does not visually block sight lines, including when used on permanently-mounted fixtures, such as on a pole, on the wall or on the ceiling, or when place on another mounting apparatus; c) the lens shape is typically much taller than wide, thus taking advantage of the tendency of the human eye to observe objects on the horizontal plane, rather than the vertical plane, and thereby reducing the blocked sight lines as compared with other luminaires that are balloon-shaped, ellipsoidal or other wider shapes; and d) so-called hotspots that are present close to the luminaire itself are eliminated, while the more distant surrounding areas are better illuminated.

Regarding the transportability that results from the third aspect discussed above, in order to reconcile the conflicting requirements of large size and ease of portability, prior art commonly uses inflatable or collapsible designs for the diffuser (so-called "balloon lighting", as but one example) These systems may use balloons made of fabric or polymer materials that are inflated when required. Other designs use thin panels of more rigid materials that are collapsible or need to be assembled when the luminaire is set up. In both cases, the diffuser is thus made to a minimum size for transportation, and then inflated, expanded or set up to the necessary larger size when in use. These prior art luminaires that must be inflated, expanded or set up therefore require a significant amount of time to set up, which is costly in terms of time and labor. When used in emergency work, such delays are even more undesirable. The shape of the lens, particularly when tall and cylindrical, provides an easily transportable luminaire that requires little or no set up on arrival, thus eliminating undesirable delays in setting up the light.

FOURTH ASPECT: A fourth aspect of various embodiments of the present subject matter concerns the filtration of UV light produced by the lighting source (lamps or bulbs) within a luminaire. Typically HID lamps and other types of lamps emit harmful or undesirable ultra-violet light (UV light). At work sites or in areas where illumination is being provided, it is necessary to filter out this UV light so as to eliminate its harmful effects on the eyes and skin. It is common in the art to paint on coatings on the inner or outer surfaces of the diffusing envelope or lens to filter out UV light or, in some cases, to select lamps that do not emit UV light in the first place. This luminaire achieves UV light filtration in a novel fashion. Various embodiments perform UV light filtration achieved by mixing a UV light filtering compound into the lens material itself at the time of molding, so that it is contained within the lens materials and not simply painted onto or applied to the inner or outer surface. This ensures the UV light filtration is still effective even if the lens is scratched, scuffed, abraded, or even significantly damaged (short of puncture or holes in the lens), since redundant filtration is achieved through the entire thickness of the lens.

FIFTH ASPECT: A fifth aspect of various embodiments of the present subject matter concerns the semi-soft, flexible nature of the lens diffuser itself. This lens diffuser is much more resistant to damage and provides greater durability because it is composed of a semi-soft, very flexible material rather than a rigid material such as a hard plastic, acrylic, polycarbonate or glass, which are common in the art, and which are typically brittle and prone to cracking or shattering. This applies to mobile lighting as well as fixed, permanently-mounted luminaires, and in the latter case, the fixtures typically rely on glass, rigid polymer or polycarbonate covers or diffusers which may break if impacted by passing objects, or if the light pole falls, or when disassembled and/or reassembled during bulb changes. Notably, in transportable applications (mobile lighting), the mast holding up the luminaire may be lowered and the operators may simply drive away without having to apply a cover, or having to remove a deflated envelope, or having to collapse and/or disassemble the lens, or having to pack away any components, such as removing the lamp bulbs. The semi-soft lens protects the components within. The lamp bulbs, in this luminaire, are simply left in place within the luminaire since the lens diffuser serves as the protective cover due to its semi-soft, flexible nature.

SIXTH ASPECT: A sixth aspect of various embodiments of the present subject matter may involve the addition of a combination of a Fresnel lens-like apparatus either as a separate lens within an outer diffuser lens or molded directly into the diffuser lens itself. While a Fresnel lens is primarily designed to focus light in a single direction (such as within a lighthouse), this alternative "Fresnel-like" lens is designed instead to project omni-directionally either horizontally or slightly down-canted, such that the refraction surfaces appear like bands circling the inside of the lens. Thus, the cross-section of the lens at any point across the diameter would appear like a Fresnel lens shape in its design, however, the lens instead wraps around the internal surface of the lens (see FIG. 3). Either a single Fresnel-type lens or a double-Fresnel-type lens (also as shown in FIG. 3) can be employed to achieve this effect. By placing the Fresnel-like lens(es) either within the lens diffuser or molding the Fresnel-like optical surfaces directly into the face of the lens diffuser itself, where each Fresnel lens is typically made of either glass or of an optical polymer or of other materials with similar refracting optical properties, the illumination may be projected horizontally or slightly down-canted from the horizontal and in all directions. In this way, low-glare and omni-directional illumination with little or no upward vertical loss (or in some embodiments no downward vertical loss) is achieved.

SEVENTH ASPECT: A seventh aspect of various embodiments of the present subject matter is that the lamp bulbs may or may not be mounted on a shock-absorbing frame, with the intent of such mounting being to further reduce potential shock damage to the lamp bulbs such as from impacts or from the effects of towing the transportable version of the luminaire over an uneven surface, such as a pot-holed road or a rough, dirt road to/from a work site. This aspect includes the use of spring-mounted tensioning lines that also combine to ensure that the bulb or bulbs are held tightly in their sockets so that they do not come loose when jarring occurs, such as when the luminaire is mounted on a retracted/lowered mast as part of a mobile lighting tower when it is transported over rough surfaces.

EIGHTH ASPECT: An eighth aspect of various embodiments of the present subject matter may involve using a partially reflective patterning mounted on or affixed to the inside of the diffusing lens so as to reduce the amount of light shining through the lens diffuser at points closer to the bulb, thereby achieving relatively more even light distribution across the surface of the lens, reducing harmful glare.

INDIVIDUALLY OR IN COMBINATION: Each aspect described may be found individually or in combination in various embodiments to achieve the desired results and to address different illumination requirements. The list herein is not intended to be exclusive or exhaustive.

What is claimed is:

1. A luminaire system configured to connect to a power source, comprising:

a semi-soft and flexible, translucent or transparent diffuser lens, that absorbs impacts, collisions, and other damaging forces while retaining its shape and is not prone to cracking or shattering;

a plurality of high intensity discharge lamps within the semi-soft and flexible diffuser lens; and a cooling fan ventilation system in communication with an interior of the diffuser lens to reduce heat buildup due at least to operation of the plurality of high intensity discharge lamps, wherein the configuration of the diffuser lens with respect to the plurality of high discharge lamps protects internal electrical components, including at least the plurality of high intensity discharge lamps, wherein the diffuser lens has a shape designed to minimize vertical losses of illumination by projecting or redirecting or projecting and redirecting the illumination onto the horizontal plane so as to provide wider area illumination, and wherein the luminaire system includes a base plate configured to be mounted on a pole, a mast, a wall, or a ceiling to better illuminate an area.

2. A luminaire system in accordance with claim 1 wherein the luminaire system utilizes internal deflectors or mirrors or deflectors and mirrors to provide efficient distribution or focal direction of light.

3. A luminaire system in accordance with claim 1 wherein the diffuser lens is cylindrically shaped so as to evenly or nearly evenly illuminate the efficient lit area of the luminaire system.

4. A luminaire system in accordance with claim 1 wherein said diffuser lens varies in thickness based on its proximity to the one or more high intensity discharge lamps so as to more evenly spread the illumination across the surface area of the diffuser lens.

5. A series of luminaires with diffuser lenses in accordance with claim 1 wherein the series of luminaires are designed to work in conjunction and/or separately, with or without separate on/off switches, so as to allow users to control the directionality of the diffuse light.

6. The luminaire system of claim 1, wherein the diffuser lens is a shaped diffuser lens, whether rigid or semi-soft and flexible, with UV filtration compounds mixed into the material comprising the diffuser lens as an alternative to a UV filtration coating or paint on the inside or outside of said diffuser lens.

7. The luminaire system of claim 1, wherein the luminaire comprises patterning or reflective mirrored, semi-reflective, or non-reflective pattern markings on the inside of a diffuser lens or between the diffuser lens and illuminating lamps so as to more evenly spread the illumination across the surface area of the diffusor lens to more efficiently reduce glare.

8. An omni-directional Fresnel-like lens used in the luminaire system of claim 1 that may or may not be housed within and working in conjunction with an outer diffuser lens so as to both redirect and spread available illumination omni-directionally and simultaneously reduce glare.

9. The luminaire system of claim 1 wherein the lens is semi-cylindrically shaped, so as to evenly or nearly evenly illuminate the efficient lit area of the luminaire system.

10. The luminaire system of claim 1, wherein the plurality of high intensity discharge lamps are four (4) high intensity discharge (HID) lamps.

11. The luminaire system of claim 10, wherein the 4 high intensity discharge lamps are mounted on an internal mast.

12. The luminaire system of claim 11, wherein the 4 high intensity discharge lamps are mounted in a circular configuration symmetrical about an axis of the internal mast.

13. The luminaire system of 12, wherein the cooling fan ventilation system comprises a plurality of cooling fans to circulate air.

14. The luminaire system of claim 13, wherein the cooling fan ventilation system is mounted in a base plate.

15. The luminaire system of claim 14, wherein the cooling fan ventilation system includes at least one fan to draw cool air into the interior of the luminaire system.

16. The luminaire system of claim 14, wherein the cooling fan ventilation system includes at least one fan to expel heat from the interior of the luminaire system.

17. A luminaire system configured to connect to a power source, comprising:

a semi-soft and flexible, translucent (or transparent) omni-directional diffuser lens, that absorbs impacts, collisions, and other damaging forces while retaining its shape and is not prone to cracking or shattering;

a plurality of internal mirrors;

a plurality of high intensity discharge lamps within the semi-soft and flexible diffuser lens; and a cooling fan ventilation system in communication with an interior of the diffuser lens to reduce heat buildup due at least to operation of the plurality of high intensity discharge lamps, wherein the omni-directional lens and internal mirrors are configured to more evenly spread illumination from the lamps within the lens across the widest possible area;

wherein the configuration of the diffuser lens with respect to the plurality of high discharge lamps protects internal electrical components, including at least the plurality of high intensity discharge lamps, and wherein the luminaire system includes a base plate configured to be mounted on a pole, a mast, a wall, or a ceiling to better illuminate an area.

18. A luminaire system configured to connect to a power source, comprising:

a semi-soft and flexible, translucent (or transparent) diffuser lens, that absorbs impacts, collisions, and other damaging forces while retaining its shape and is not prone to cracking or shattering;

a plurality of high intensity discharge lamps mounted over a base plate on an internal mast and inside the diffuser lens; and a cooling system disposed about the base plate and in communication with an interior of the diffuser lens to reduce heat buildup due at least to operation of the plurality of high intensity discharge lamps, wherein the diffuser lens protects the one or more high intensity discharge lamps, wherein the configuration of the diffuser lens protects at least internal electrical components, including at least the plurality of high intensity discharge lamps, wherein the diffuser lens has a shape designed to minimize vertical losses of illumination by projecting or redirecting or projecting and redirecting the illumination onto the horizontal plane so as to provide wider area illumination, and wherein the luminaire system is configured to be mounted on a pole, a mast, a wall, or a ceiling to better illuminate an area.

19. The luminaire system of claim 18, wherein the diffuser lens is cylindrically shaped, the plurality of high intensity discharge lamps are 4 high intensity discharge (HID) lamps mounted on the internal mast in a circular configuration symmetrical about an axis of the internal mast, and the cooling system includes one or more fans mounted using at least in part the base plate.

20. A luminaire system in accordance with claim 18, wherein the luminaire system utilizes internal deflectors or mirrors or deflectors and mirrors to provide efficient distribution or focal direction of light.

* * * * *